United States Patent
Bhimireddy et al.

(10) Patent No.: US 11,249,884 B2
(45) Date of Patent: Feb. 15, 2022

(54) DEVICE FOR SOFTWARE CRASH SIMULATION FOR A SOFTWARE PRODUCTION ENVIRONMENT

(71) Applicant: Bank of America Corporation, Charlotte, NC (US)

(72) Inventors: Venkata R. Bhimireddy, Charlotte, NC (US); Pavan Chayanam, San Francisco, CA (US); Srinivas Dundigalla, Charlotte, NC (US); Sandeep Verma, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/880,720

(22) Filed: May 21, 2020

(65) Prior Publication Data

US 2021/0365353 A1 Nov. 25, 2021

(51) Int. Cl.
G06F 11/36 (2006.01)
G06N 20/00 (2019.01)
G06F 11/34 (2006.01)

(52) U.S. Cl.
CPC ...... *G06F 11/3664* (2013.01); *G06F 11/3409* (2013.01); *G06N 20/00* (2019.01)

(58) Field of Classification Search
CPC .. G06F 11/3664; G06F 11/3409; G06N 20/00
USPC .............................................. 717/124–167
See application file for complete search history.

(56) References Cited

U.S. PATENT DOCUMENTS

| 5,666,297 | A | * | 9/1997 | Britt ........................ G06F 17/12 703/18 |
| 8,494,832 | B2 | * | 7/2013 | Krishnan ............ G06F 11/3696 703/22 |
| 8,516,308 | B1 | | 8/2013 | Gill et al. |
| 9,519,869 | B2 | | 12/2016 | Hwang |
| 10,013,334 | B1 | * | 7/2018 | Carey ................. G06F 11/3636 |
| 2010/0088546 | A1 | | 4/2010 | Chilimbi et al. |
| 2013/0139128 | A1 | * | 5/2013 | Jones .................. G06F 11/3664 717/128 |
| 2016/0342499 | A1 | * | 11/2016 | Cheng ................. G06F 11/3664 |

OTHER PUBLICATIONS

Kumar, Ram Shankar Siva, et al. "Failure modes in machine learning systems." arXiv preprint arXiv:1911.11034 (2019).pp.1-12 (Year: 2019).*

Ziola, Artur. "Verification of road accident simulation created with the use of PC-Crash software." Zeszyty Naukowe. Transport/ Politechnika Śląska (2018).pp.211-221 (Year: 2018).*

(Continued)

*Primary Examiner* — Satish Rampuria
(74) *Attorney, Agent, or Firm* — Banner & Witcoff, Ltd.

(57) ABSTRACT

A crash test simulator device for re-creating a software crash scenario within a virtual environment using artificial intelligence processes to consider a large group of variables that may be relevant to the crash incident. The crash test simulator device includes a production environment monitoring engine configured to monitor a user's interaction with an application implemented within a production environment, and generate information used to re-create a crash incident within a virtual environment.

20 Claims, 6 Drawing Sheets

(56) References Cited

OTHER PUBLICATIONS

Fazzini, Mattia, et al. "Automatically translating bug reports into test cases for mobile apps." Proceedings of the 27th ACM SIGSOFT International Symposium on Software Testing and Analysis. 2018. pp.141-152 (Year: 2018).*

Oki, Brian M., and Barbara H. Liskov. "Viewstamped replication: A new primary copy method to support highly-available distributed systems." Proceedings of the seventh annual ACM Symposium on Principles of distributed computing. 1988.pp.8-17 (Year: 1988).*

Ferreira, Kurt, et al. "Evaluating the viability of process replication reliability for exascale systems." Proceedings of 2011 International Conference for High Performance Computing, Networking, Storage and Analysis. 2011.pp.1-12 (Year: 2011).*

Moran, Kevin, et al. "Automatically discovering, reporting and reproducing android application crashes." 2016 IEEE international conference on software testing, verification and validation (icst). IEEE, 2016.pp.33-44 (Year: 2016).*

* cited by examiner

FIG. 2

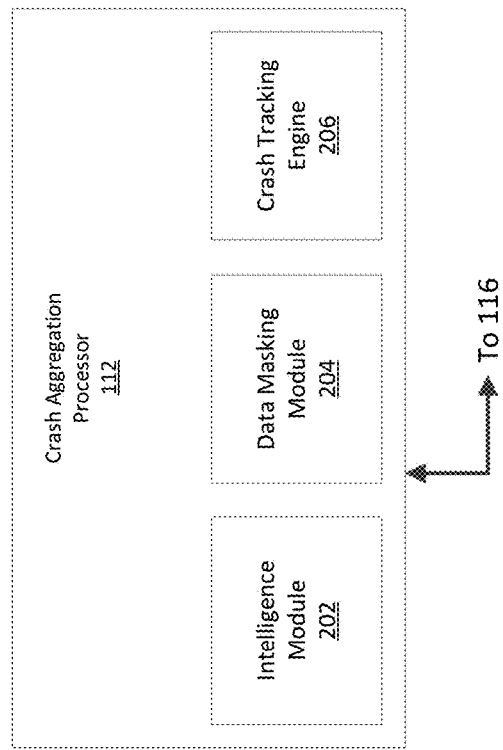

Crash Aggregation Processor 112
- Intelligence Module 202
- Data Masking Module 204
- Crash Tracking Engine 206

Crash Event Array 108

| Flow | Services | Dependant Classes |
|---|---|---|
| FlowTypeA 302 | InitiateAuthentication 306 | BootStrapClass 330<br>PreAuthClass 332 |
| | ValidateCustomerIdentity 308 | EncryptionClass 334<br>HashingClass 336<br>RiskAnalyzeClass 338<br>DecisionMakerClass 340 |
| | VerifyChallengeQuestion 310 | CompileChallenge 342<br>EncryptionClass 344<br>HashingClass 346<br>ValidateChallengeClass 348<br>CheckSQLClass 350<br>DecisionMakerClass 352 |
| | AuthenticationCall 312 | AllowDenyClass 354<br>FetchCustomerClass 356 |
| FlowTypeB 304 | InitiateAuthentication 314 | BootStrapClass 358<br>PreAuthClass 360 |
| | ValidateCustomerIdentity 316 | EncryptionClass 362<br>HashingClass 364<br>RiskAnalyzeClass 366<br>DecisionMakerClass 368 |
| | SendAuthorizationCode 318 | CallClass 370<br>FetchClass 372 |
| | ValidateAuthorizationCode 320 | Encrypt2Class 374<br>EncryptionClass 376<br>HashingClass 378<br>DecisionMakerClass 380 |
| | AuthenticationCall 322 | AllowDenyClass 382<br>FetchCustomerClass 384 |

DEVICE FOR SOFTWARE CRASH SIMULATION FOR A SOFTWARE PRODUCTION ENVIRONMENT

TECHNICAL FIELD

Aspects of this disclosure generally relate to crash simulator devices. In particular, aspects of the disclosure relate to a device that monitors user interactions with applications implemented within a production environment, identifies elements common to one or more crash events experienced within the production environment, and implements a virtual replication of the one or more crash events.

BACKGROUND

Crash testing may involve re-creating a scenario experienced within a software production environment that resulted in one or more errors, or crashes, that prevented the software from accomplishing one or more intended tasks. The re-created scenario may be used to evaluate the cause of the errors such that they may be resolved for future use of the production environment. However, re-creation of the scenario that resulted in the crash may involve many different variables. Further, it may be desirable to determine the extent to which the crash is unique or may be experienced by multiple different users, at multiple different times, in the process of carrying out multiple different tasks, or using multiple different software elements or platforms to access the production environment, among others. As such, given the high number of variables as inputs to the crash re-creation, the determination of the scope of the crash testing is complex and labor-intensive. Further, no device exists that accomplishes automatic determination of the appropriate conditions for re-creation of a crash test, and implementation of those conditions within a virtual environment such that the testing does not need to be carried out within a production environment.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to a crash test simulator device that includes a production environment monitoring engine that is configured to monitor a user's interaction with an application implemented within a production environment. The production environment monitoring engine may include a crash activity identification processor. This crash activity identification processor may be configured to receive information from a logging system that stores information about a user's interaction with the application. The crash activity identification processor may also be configured to filter the received data in order to identify a crash event. Additionally, the crash activity identification processor may identify dependent software classes utilized during the user's interaction with the production environment prior to the crash event, and store in a crash event array information about the crash event in combination with identified dependent software classes. The crash simulator device may additionally include a crash aggregation processor that is configured to receive crash event information from the crash event array, and identify a pattern in crash events from the received crash event information. The crash aggregation processor may also be configured to output crash characteristic data associated with the identified pattern. The crash simulator device may also have a virtual environment engine that is configured to receive the crash characteristic data from the crash aggregation processor, to implement a virtual environment corresponding to the crash characteristic data, and output an interface that replicates the production environment and the crash event.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

FIG. 2 schematically depicts a crash aggregation processor, according to one or more aspects described herein;

FIG. 3 schematically depicts an example of a data structure stored within a crash event array, according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
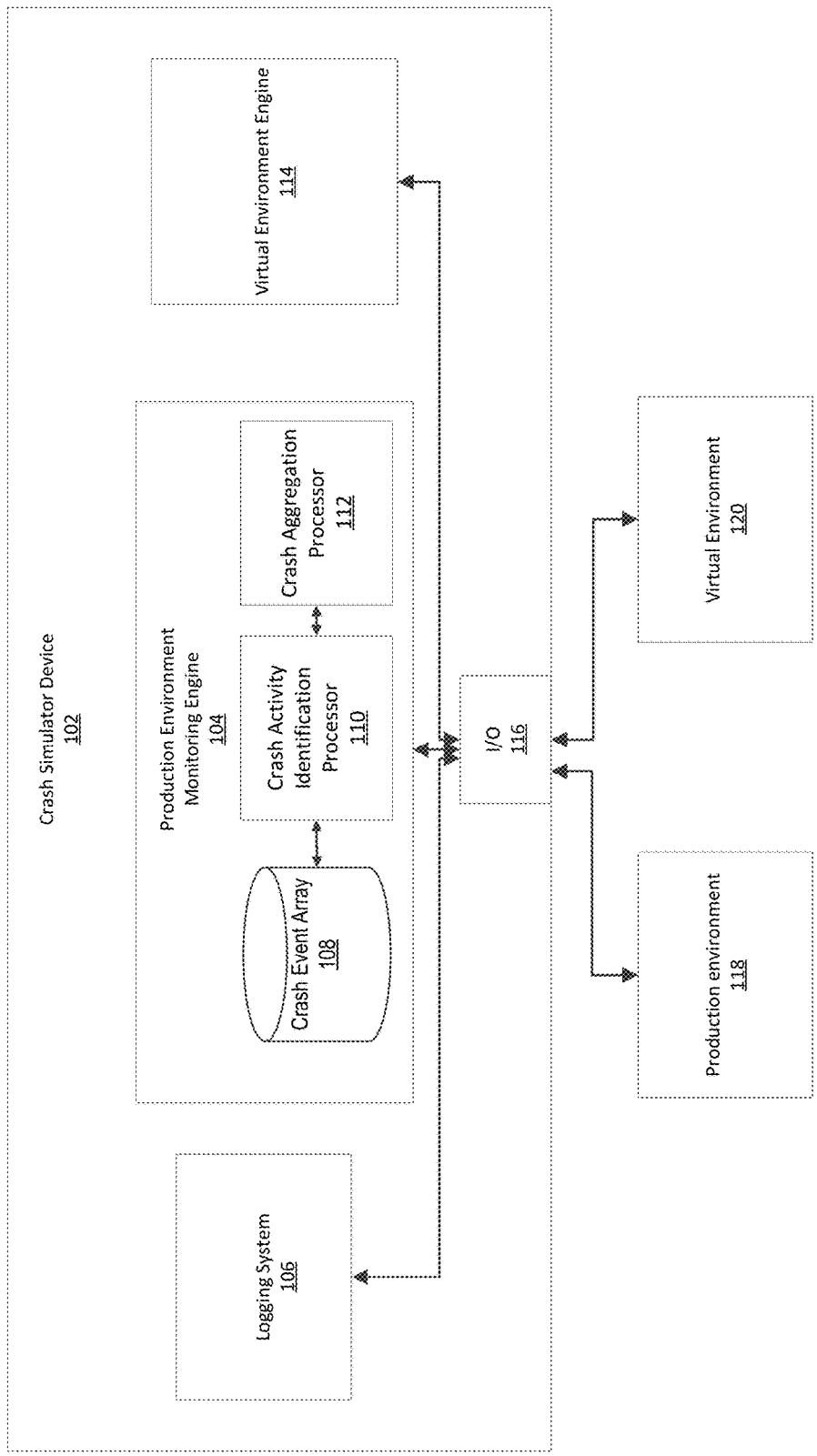
FIG. 1 schematically depicts a crash simulator device, according to one or more aspects described herein.

FIG. 1 schematically depicts a crash simulator device 102, according to one or more aspects described herein. It is contemplated that the crash simulator device 102 may be implemented as one or more hardware elements that include one or more application-specific integrated circuits. In addition, or as an alternative, the regression test generator device 102 may include software and/or firmware elements in order to implement the functionality described herein. Further examples of implementation solutions of the crash simulator device 102 are presented in proceeding sections of this disclosure.

The crash simulator device 102 may include a production environment monitoring engine 104. The production environment monitoring engine 104 may be configured to monitor user interaction with a production environment 118, and with one or more applications running within the production environment 118. In one example, production environment 118 may include hardware, firmware, and/or software configured to host one or more applications with which one or more users interact. These one or more users may be co-located with the production environment 118, or may be distributed, and may access the production environment through one or more wired or wireless communication networks. It is contemplated that any implementation of production environment 118 may be used with the crash simulator device 102, including any combination of purpose-built and/or general-purpose hardware, firmware, and/ or software using one or more computational processors or cores housed in one or more server devices. The production environment 118 may also be implemented using, among others, virtualization or container solutions. Further, the crash simulator device 102 may communicate with a production environment 118 from a remote location, or may be co-located with the production environment 118. It is further contemplated that the production environment 118 may facilitate a single application, or many instances of a same or different applications. The applications hosted and deployed within the production environment 118 may have any functionality, and may be accessed by one or more users across a private network, or through a wide area network, such as the Internet. It is further contemplated that the crash simulator device 102 may be in operative communication with a single production environment 118, or multiple production environments, without departing from the scope of this disclosure.

The crash simulator device 102 may include a logging system 106 that is configured to monitor a user's interaction with one or more applications executed within the production environment 118. In one implementation, the logging system 106 may receive from the production environment 118 information about the user, hardware and software used by the user to access the production environment 118, and information about a user's actions within the production environment 118. Accordingly, the information received by the logging system 106 from the production environment 118 may include biographic information associated with the user, user login credential information, a type of device and network hardware used by the user to access the production environment 118 (a smartphone, a desktop computer, a tablet, a public wifi network, a private wifi network, a wired network, a cellular network, a router type, an internet service provider, a cellular service provider, among others), a type of software used by the user to access the production environment 118 (an operating system type and version, an application type including a web browser type and version or standalone application type and version, a time, date, duration of access of the production environment, among others), user interfaces within the production environment 118 accessed/interacted with prior to one or more crash events, tasks carried out within the production environment prior to the crash event, details of an interface and tasks with which the user is interacting at the time of the crash event, interface buttons interacted with, text entered, among others. The data points received from the production environment 118 by the logging system 106 may be stored within any data structure type, and in any form, without departing from the scope of these disclosures. Accordingly, the logging system 106 may include one or more storage devices for storing information received from the production environment 118, or may access information stored within one or more storage devices external to the logging system 106 and/or crash simulator device 102.

The crash simulator device 102 may additionally include a production environment monitoring engine 104 that is configured to execute further processes to monitor a user's interaction with the production environment 118. Accordingly, the production environment monitoring engine 104 may receive information from the logging system 106. In one example, the production environment monitoring engine 104 includes a crash activity identification processor 110 that is configured to receive data from the logging system 106 and filter the received data to identify one or more crash events. A crash event may otherwise be referred to as a bug, fault, exception, error, or any other event that is associated with a failure of an application to execute one or more processes to bring about a desired action for the user or for another software element in a larger software system. As will be apparent to those of skill in the art, the actions to which this type of crash may be applicable are wide and varied, and may include any process that a software application is intended to perform, without departing from the scope of these disclosures.

In one example, the crash activity identification processor 102 polls the logging system 106 and searches through one or more databases of the logging system 106 to identify a crash event. In another example, the logging system 106 sends one or more crash event details to the crash activity identification processor 110 upon receiving an indication of a crash from the production environment 118. In one example, the crash activity identification processor 110 may execute one or more filtering processes to parse the information received from the logging system 106, and to identify a crash incident from the received data. These one or more filtering processes may include one or more search processes configured to identify error codes, flags, or exception indicators, among others. Further, these one or more filtering processes may employ any known data filtering methodologies, without departing from the scope of these disclosures.

The crash activity identification processor 110 may additionally be configured to identify dependent software classes utilized during a user's interaction with the production environment 118 prior to the identified crash event. In one example, an application running within the production environment 118 may be built from one or more sub-components. These sub-components may utilize one or more software classes. Accordingly, the crash activity identification processor 110 may identify from the data received from the logging system 106, software classes that a user accesses when interacting with the application running within the production environment 118. In one example, the crash activity identification processor 110 may determine a functional path that is followed through one or more software classes. This functional path may be based upon the user's actual interaction with the application within the production environment 118, or upon a predicted path associated with a prediction of a task or activity that a user intends to perform within an application, as identified by the crash aggregation processor 112.

The crash activity identification processor 110 may additionally execute one or more processes to determine whether a specific or generalized crash type, or functional path followed through the identified software classes utilized during the user's interaction with the production environment 118 represents a new path or a path already encountered by the crash activity identification processor 110 during a previous interaction with the production environment 118 by a same or a different user. In one example, if the functional path is determined to be a new path, the crash activity identification processor 110 may execute one or more processes to store information about the functional path in the crash event array 108. In another example, the crash activity identification processor 110 may store all identified information about one or more crash events in a crash event array 108, which includes both unique and non-unique crash events. This stored information may be combined with those dependent software classes identified by the crash to be identification processor 110.

The crash event array 108 of the production environment monitoring engine 104 may be implemented as a database using any data structures and/or formats and using any data management processes. In one example, the data stored within the crash event array 108 may duplicate information received from the logging system 106. Additionally or alternatively, the crash event array 108 may store references, pointers, or links to data stored within the logging system 106 such that information is not duplicated within the crash simulator device 102.

The production environment monitoring engine 104 may also include a crash aggregation processor 112 that is configured to receive crash event information from the crash event array 108. In one example, the crash aggregation processor 112 may execute one or more processes to poll or request crash event information from the crash event array 108. Additionally, the crash aggregation processor 112 may execute one or more pattern recognition processes on the received crash event information. Further, the crash aggregation processor 112 may utilize artificial intelligence processes to identify patterns within the data received from the crash event array 108. This artificial intelligence process functionality is described in further detail in relation to FIG. 2. Advantageously, the artificial intelligence processes executed by the crash aggregation processor 112 may be utilized to more effectively identify and/or generate crash characteristic data associated with crash event stored within the crash event array 108. In one example, the crash aggregation processor 112 may be utilized to output crash characteristic data that generalizes a crash event experienced by an individual user to encompass an error in the production environment 118 that may be experienced by the individual user on a recurring basis, and/or a large group of users with a multitude of different characteristics that might otherwise not be considered to have any commonality with the crash experienced by the individual user.

Further, the crash aggregation processor 112 may be utilized to identify crash characteristic data that considers a plurality of different variables in a plurality of different configurations with a computational complexity and speed that is beyond that which could be considered by a human. Further, the computational complexity and speed with which the crash aggregation processor 112 outputs crash characteristic data may be facilitated by the artificial intelligence processes executed by the crash aggregation processor 112, and the number of variables and complexity may be beyond that which could be computed by conventional processing without artificial intelligence processes. The crash characteristic data outputted by the crash aggregation processor may include a plurality of state information and settings associated with one or more tasks or processes that may be implemented within an application running within the production environment 118. The state information settings data points may have any data structure form, without departing from the scope of these disclosures.

The crash simulator device 102 may additionally include a virtual environment engine 114 that is configured to receive the crash characteristic data from the crash aggregation processor 112. The virtual environment engine 114 may utilize the received crash characteristic data to implement a virtual environment 120 that corresponds to the crash characteristic data. In one example, the virtual environment 120 may replicate functionality of one or more applications running within the production environment 118, but may be configured to execute a copy of the application separate to the production environment, and using specific settings associated with a user who experienced a crash within the production environment 118. The virtual environment 120 may set up the application such that the crash is replicated in accordance to how it was experienced by the user within the production environment 118. In addition, the crash characteristic data used to setup the application running within the virtual environment 120 may create a crash event common to more than one user, with this commonality identified by the artificial intelligence processes of the crash aggregation processor 112. The virtual environment 120 may replicate software, firmware and hardware of the production environment 118 and a user interacting with the production environment 118, and using a partly or wholly software implementation to replicate these software, firmware, and hardware elements.

The virtual environment engine 114 may be configured to output an interface that replicates the production environment 118 and a crash event. This replication of the production environment may be within the virtual environment 120. Further, one or more quality assurance users may be provided with access to the virtual environment 120 such that the crash event may be analyzed without requiring access to the production environment 118. Accordingly, the quality assurance users may interact with the application within the virtual environment 120 without changing the application running within the production environment 118. Further, the automated setup of the virtual environment 120 by the virtual environment engine 114 may significantly reduce the time needed to set up a replication of a crash event, and may reproduce a crash event that is more widely applicable than a single crash event observed for a specific user within the production environment 118. As such, the virtual environment 120 implemented by the virtual environment engine 114 may provide enhanced results beyond those that are possible using manual observation of crash event information reported from the production environment 118, and provide the quality assurance users with a crash simulation that is more broadly applicable to users of an application running within the production environment 118. This broad applicability may result from the complexity of the variables and permutations analyzed by the crash aggregation processor 112.

It is noted that the crash simulator device 102 includes an interface device 116 that facilitates wired or wireless communication between the crash simulator device 102 and elements external to the crash simulator device 102. As depicted in FIG. 1, the interface device 116 facilitates communication between the production environment 118, the virtual environment 120, and the crash simulator device 102. It is contemplated that the interface 116 is implemented with hardware, firmware, and/or software used to facilitate communication using one or more protocols. Indeed, it is contemplated that the interface 116 may be utilized to communicate using any communication protocol, without departing from the scope of these disclosures.

FIG. 2 schematically depicts a more detailed view of the crash aggregation processor 112, according to one or more aspects described herein. In particular, the crash aggregation processor 112 may include an intelligence module 202. The intelligence module 202 may be configured to execute one or more processes, including artificial intelligence processes, to identify patterns within the crash event information received from the crash event array 108. These identified patterns within the crash event information may be used to generate crash characteristic data that is applicable to multiple users using the production environment 118 in different ways. For example, the crash characteristic data may be used to generate a crash simulation that is applicable to users accessing the production environment 118 using differing hardware, differing software, from different geographic locations, at different times, using different versions of a same application or operating system, and attempting to execute a same or different but related tasks within the production environment 118. In addition, the intelligence module 202 may be configured to implement one or more artificial intelligence processes to predict an activity that a user is intending to carry out within an application of the production environment 118. For example, the intelligence module 202 may execute one or more machine learning processes to receive data from a user's interaction with an application running within the production environment 118, and match this received data to one or more stored data patterns associated with one or more tasks available within the application of the production environment 118. In one example, the intelligence module 202 is configured to generate crash characteristic data that includes a list of dependent software classes and/or software services that are applicable to a given crash incident. This list of dependent software classes and/or services may be used to generate a virtual environment in order to simulate/re-create a specific crash incident and/or a generalized crash incident that is applicable to multiple users accessing the production environment 118 under differing circumstances (e.g., differing hardware, software, credentials, time, location, actions executed within the production environment 118, among others).

Advantageously, the intelligence module 202 may be utilized to exclude extraneous information from the data received from the crash event array 108 in order to predict a task that a user intends to carry out. For example, a user may follow a chaotic path through various levels of an interface of a software application running within the production environment 118 in an attempt to carry out one or more specific tasks. The intelligence module 202 may be adapted to recognize a pattern from the user data, and identify a known path through the application to accomplish the predicted activity. In certain examples, the intelligence module 202 may not be able to match the observed data to a predicted task or activity associated with an application of the production environment 118. In such instances, the intelligence module 202 may store one or more new, learned tasks associated with the received data. In one example, the learned tasks may be associated with an identifier based upon a destination interface with which a user interacts within an application running in the production environment 118. Further, the one or more learned tasks may be stored as software paths within the crash event array 108. In one example, the intelligence module 202 may access the database of previously stored software paths within the crash event array 108 in order to match observed user interaction data to a predicted task. The artificial intelligence and/or machine learning processes associated with the intelligence module 202 are described in further detail below.

In one example, a framework for machine learning may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result in an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possible be optimized in the machine learning system.

In some embodiments, one or more of the processes executed by the intelligence module 202 may use a system of machine learning and/or artificial intelligence to improve accuracy of the determinations made by said device 202, and using one or more of the processes previously described in relation to artificial intelligence. As explained herein, a framework for machine learning may involve a combination of supervised and unsupervised learning models.

The crash aggregation processor 112 additionally includes a data masking module 204. The data masking module 204 may be configured to execute one or more processes to mask, delete, anonymize, hash, or otherwise render secure information outputted from the crash aggregation processor 112. In one example, the data masking module 204 may be configured to mask biographic information associated with one or more users prior to crash characteristic data being outputted to the virtual environment engine 114. Data masking module 204 may utilize any data masking methodologies and/or processes, without departing from the scope of these disclosures.

The crash aggregation processor 112 may additionally include a crash tracking engine 206. The crash tracking engine 206 may be configured to receive data from the crash aggregation processor 112 regarding a crash event, and to generate a login profile that replicates characteristics of one or more users. The login profile may be used to access the virtual environment 120, such that a quality assurance user accessing the virtual environment 120 has login credentials that mimic those of the user of the production environment 118, in order to replicate a crash experienced within the production environment 118.

FIG. 3 schematically depicts an example of a data structure stored within the crash event array 108, according to one or more aspects described herein. As previously described, the crash aggregation processor 112 may be configured to store, in the crash event array 108, a path through an application implemented within the production environment 118. In one example, a path through an application implemented within the production environment 118 may otherwise be referred to as a "flow," whereby a flow is associated with a type of task that a user is able to carry out within an application. A given flow may utilize different services that are implementing the application running within the production environment 118. Further, the services may be made up from different dependent software classes. Accordingly, the crash aggregation processor 112 may store within the crash event array 108 a flow that identifies a type of task, and one or more services associated with that flow. Additionally, for each of the one or more services, one or more dependent classes may be stored. The crash aggregation processor 112 may search within the crash event array 108 for one or more classes identified by the intelligence module 202. Further, the crash aggregation processor 112 may identify one or more software services and flows associated with the classes found within the crash event array 108. The crash aggregation processor 112 may output, within the crash characteristic data, one or more flows associated with the identified classes that are identified as being responsible or related to one or more crashes within the production environment 118.

FIG. 3 schematically depicts two example flow types 302 and 304 stored within the crash event array 108. It is contemplated that the crash event array 108 may store thousands or millions of different flow types in combination with associated services and classes. In the depicted example, services 306-312 are used by FlowTypeA 302 and services 314-322 are used by FlowTypeB 304. Further, dependent software classes 330-356 are used by one or more of the services 306-312 and dependent software classes 358-384 are used by one or more of the services 314-322. In one example, one or more dependent classes may be repeated within the data structure of the crash event array 108 as multiple different flows and/or services use a same software class. Similarly, one or more services may be repeated within the crash event array 108 as multiple different flows utilize a same software service module.

In one specific example, the crash aggregation processor 112 may identify that an EncryptionClass is involved in a crash event observed in the production environment 118. In response, the crash aggregation processor 112 may search through the crash event array 108 for instances of EncryptionClass. The crash aggregation processor 112 may identify the EncryptionClass 334 as being used within the ValidateCustomerIdentity 308 service and the VerifyChallengeQuestion 310 service of FlowTypeA 302, and the ValidateCustomerIdentity 316 service and ValidateAuthorizationCode 320 service of FlowTypeB 304. The crash aggregation processor 112 may include each of the services 308, 310, 316, and 320, and/or all or part of FlowTypeA 302 and/or FlowTypeB 304 in the outputted crash characteristic data sent to the virtual environment engine 114.

Figure 4:
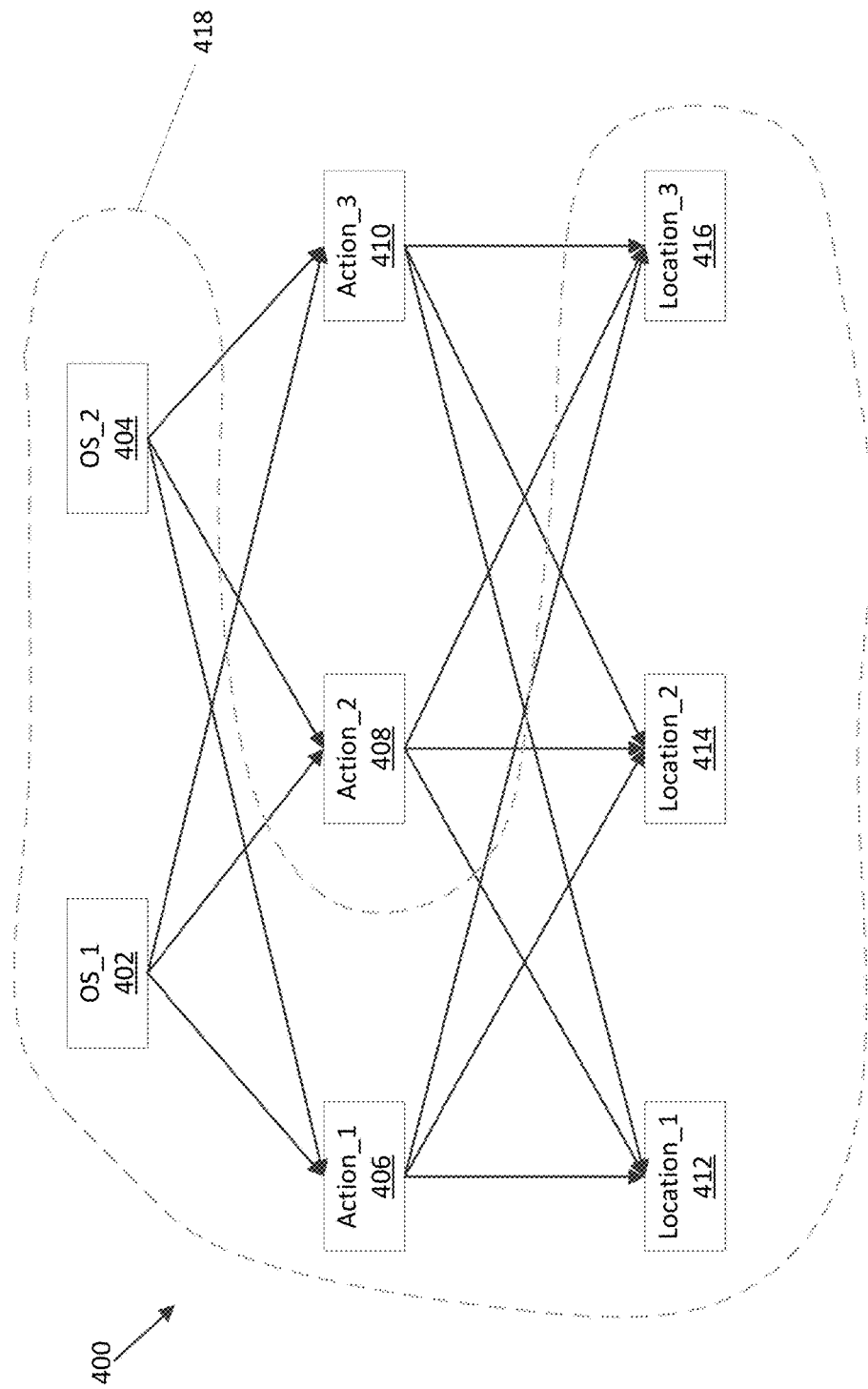
FIG. 4 schematically depicts additional data stored within the crash event array, according to one or more aspects described herein.

FIG. 4 schematically depicts additional data stored within the crash event array 108, according to one or more aspects described herein. As described in relation to FIG. 3, the crash event array 108 may store information regarding software services and dependent classes used by multiple flows of one or more applications running within the production environment 118. As previously discussed, the crash event array 108 may additionally store information received from the logging system 106 regarding the crash experienced within the production environment 118. This additional information may include an operating system type and version, an application type including a web browser type and version or standalone application type and version, a time, date, duration of access of the production environment, biographic/login information about the user accessing the production environment 118, among others.

FIG. 4 schematically depicts a data structure 400 that stores interconnections between different operating system types or version types (OS_1 402 and OS_2 404), different action types within a given application (Action_1 406, Action_2 408, Action_3 410), and different location types from which the application is accessed (Location_1 412, Location_2 414, Location_3 416). It is noted that the data structure 400 is a greatly simplified example of a structure that stores three different types of information and interconnections therebetween. It is contemplated that any addressing, linking, pointing or other communication methodology to store the interconnections between the depicted elements may be utilized. Accordingly, in one example, the intelligence module 202 may identify Action_1 416 as being responsible for, relevant to, or otherwise related to one or more crash events observed within the production environment 118. In one simple example, the intelligence module 202 may identify related data elements that are associated with Action_1 416. In the schematic depiction of FIG. 4, the intelligence module 202 may identify those elements within the schematic boundary 418 as being related to Action_1 406. As such, the intelligence module 202 may determine, based upon stored interconnections between the elements, that all of OS_1 402 and OS_2 404, and Location_1 412, Location_2 414, Location_3 416 may need to be replicated within the virtual environment 120 in order to replicate a given crash event associated with Action_1 406. Accordingly, information associated with OS_1 402 and OS_2 404, and Location_1 412, Location_2 414, Location_3 416 may be provided as part of the crash characteristic data generated by the crash aggregation processor 112 and received by the virtual environment engine 114. In one example, the intelligence module 202 may exclude Action_2 408, Action_3 410.

While FIG. 4 is a highly simplified depiction of interconnections between different variables that may be used to re-create the conditions at the time of a crash within the production environment 118, this definition of the scope of variables applicable and those that may be excluded from a re-creation of a crash is a highly complex and computationally expensive problem, given the very large number of input variables to the application running within the production environment 118. This definition of the scope of the crash characteristic data is too complex for manual calculation, or calculation using conventional deterministic computational processes in a reasonable amount of time. Advantageously, the crash simulator device 102 utilizes the artificial intelligence processes of the intelligence module 202 in order to define the crash characteristic data in comparatively shorter time than conventional processing that is intended to find an absolute, optimal, brute-force, or close to optimal solution.

Figure 5:
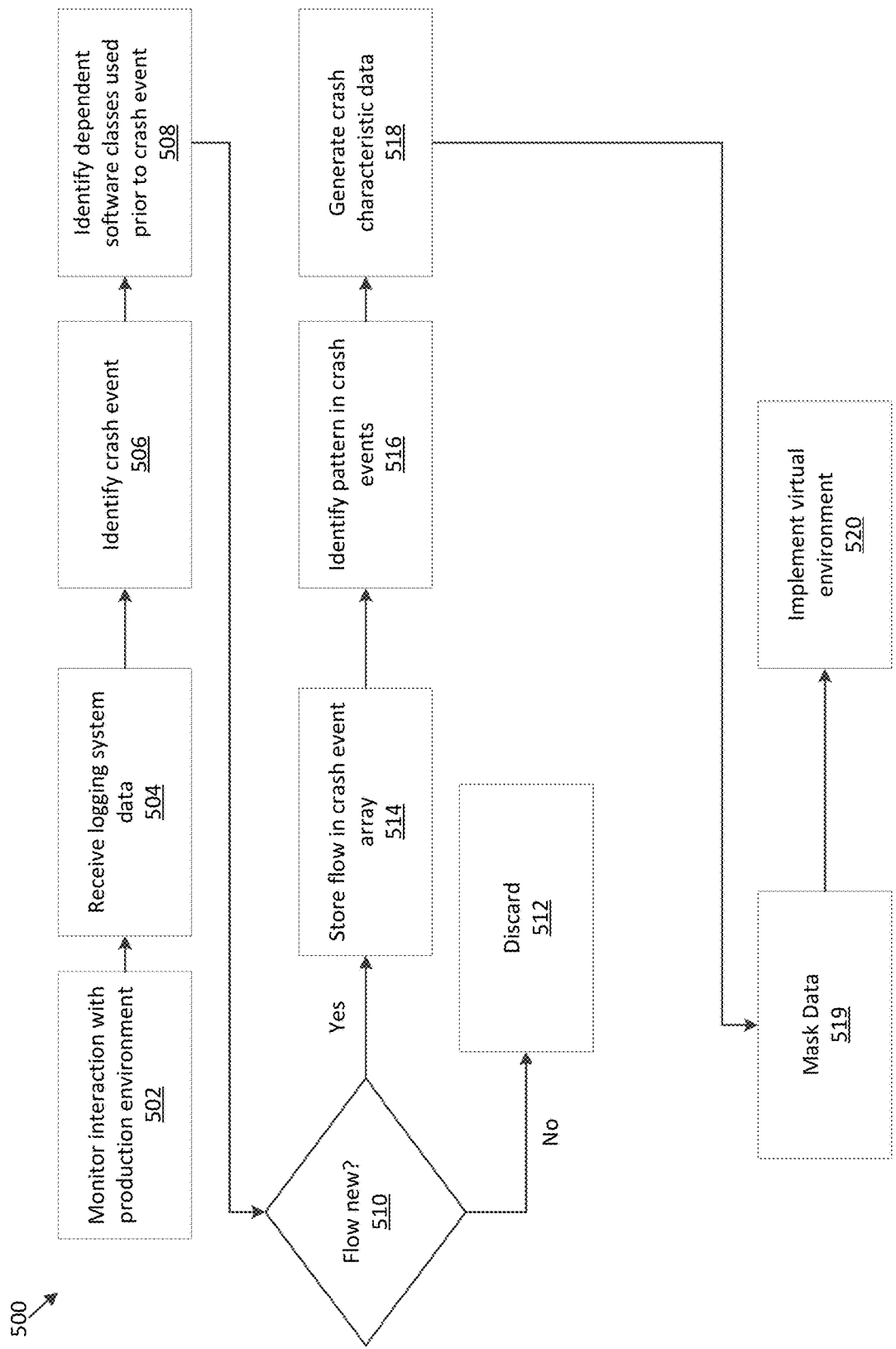
FIG. 5 is a flowchart diagram of a process that is used to define and implement a simulation of a crash test within a virtual environment, according to one or more aspects described herein.

FIG. 5 is a flowchart diagram of a process 500 that is used to define and implement a simulation of a crash test within a virtual environment 120, according to one or more aspects described herein. It is contemplated that the process 500, or any other process described throughout this disclosure, may be implemented with using sub-set of the blocks depicted in FIG. 5, or with additional elements that are not depicted in FIG. 5 but are otherwise described in this disclosure. A process may be executed at block 502 to monitor interaction with a production environment, such as production environment 118. In one example, the monitoring of the interaction may be executed by the production environment monitoring engine 104 of the crash simulator device 102. The production environment monitoring engine 104 may store information related to the production environment 118 in the logging system 106. A process may be executed at block 504 to receive logging system data from the logging system 106. This process may be executed by the production environment monitoring engine 104. Further, the production environment monitoring engine 104 may execute a process at block 506 to identify a crash event within the received logging system data. This identification of a crash event may filter the data received from the logging system 106 and identify one or more flags, indicators, notifications or other data elements that indicate a crash event that occurred within the production environment 116. Additionally, the production environment monitoring engine 104 may execute a process to identify dependent software classes used prior to the crash event. These dependent software classes may additionally include other data points related to the crash event, including a data flow through dependent software classes and services, and information related to the task and conditions under which the crash occurred within the production environment 118. The process to identify dependent software classes used prior to the crash event may be executed at block 508 of flowchart 500, and by the crash activity identification processor 110.

Decision block 510 may execute one or more processes to determine whether the identified software flow associated with block 508 is new and not previously reported to or identified by the production environment monitoring engine 104. The one or more processes associated with decision block 510 may be executed by the crash activity identification processor 110. If it is determined that the data flow is not new, flowchart proceeds to block 512, and the information associated with the identified crash event is discarded. In another example, upon determining that the data flow is not new, the crash activity identification processor may store an indication of a repeated occurrence of the crash event, such as in the crash event array 108. If, however, block 510 determines that the data flow is new, flowchart 500 proceeds to block 514, and one or more processes may be executed by the crash activity identification processor 110 to store the flow data in the crash event array 108. A process may be executed at block 516 to identify a pattern in crash events from the received crash event information. This process may be executed by the crash aggregation processor 112 upon receipt of crash event information from the crash event array 108. A process may be executed to generate crash characteristic data at block 518. This process may be executed by the crash aggregation processor 112.

The data masking module 204 may execute a process to mask crash characteristic data generated by the crash aggregation processor 112. This process may be executed at block 519 prior to receipt of the crash characteristic data by the virtual environment engine 114. Accordingly, the virtual environment engine 114 may execute one or more processes to receive the crash characteristic data from the crash aggregation processor 112 and implement a virtual environment 120 corresponding to the crash characteristic data. These one or more processes to implement the virtual environment may be executed at block 520.

Figure 6:
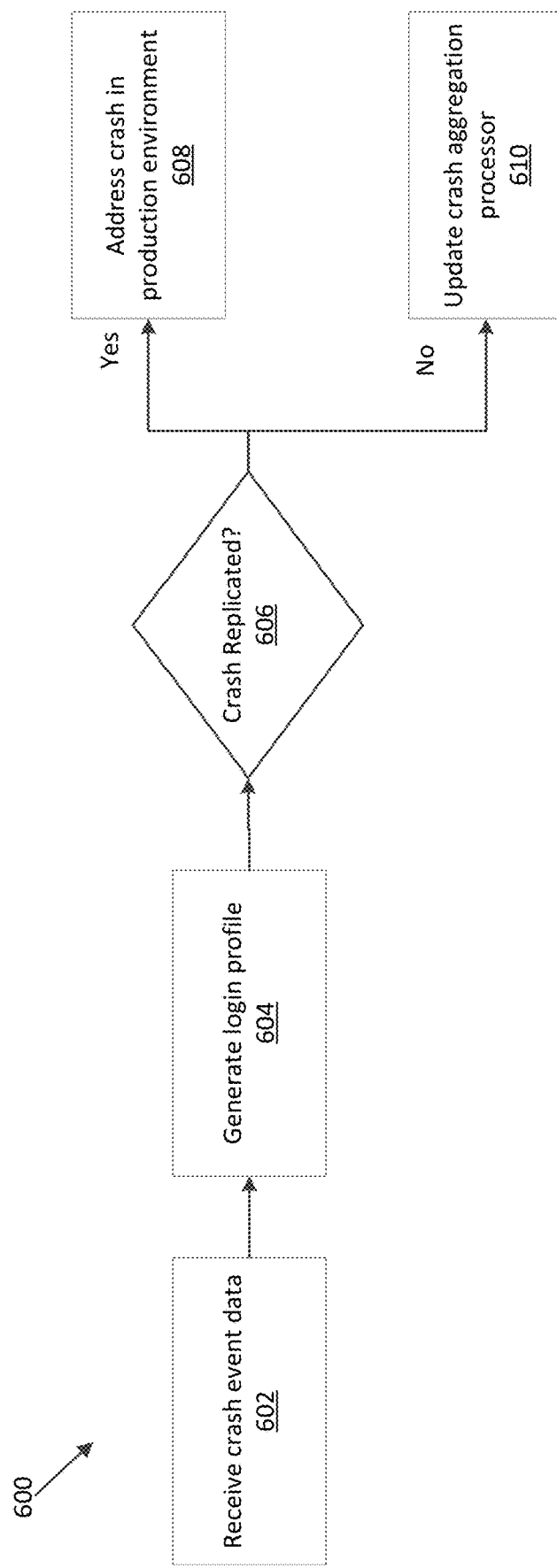
FIG. 6 is a flowchart diagram of a process for accessing a simulated crash event within a virtual environment, according to one or more aspects described herein.

FIG. 6 is a flowchart diagram of a process 600 for accessing a simulated crash event within the virtual environment 120, according to one or more aspects described herein. The crash tracking engine 206 may execute one or more processes to receive crash event data from the crash aggregation processor 112. These one or more processes to receive crash event data may be executed at block 602. Further, the crash tracking engine 206 may generate login profile data that replicates login information associated with a user of the production environment 118. This login profile data may replicate characteristics of the user, and may be used to access the virtual environment 120 in a manner similar to how the user accessed the production environment 118. These one or more processes to generate the login profile may be executed at block 604. The login profile may be used by a quality assurance user in order to access the virtual environment 120 that has been configured by the virtual environment engine 114. Decision block 606 represents one or more processes executed to determine whether the crash was replicated within the virtual environment 120 using the configuration built and implemented by the virtual environment engine 114 and the login profile generated by the crash tracking engine 206. These one or more processes executed at decision block 606 may be executed by the crash activity identification processor 110. If it is determined that the crash has been replicated within the virtual environment 120, flowchart 600 proceeds to block 608. Accordingly, at block 608, the virtual environment engine 114 may execute one or more processes to identify elements that may need to be altered within the application running within the production environment 118. If the crash activity identification processor 110 detects that the crash is not replicated, flowchart 600 may proceed to 610. The crash activity identification processor 110 may execute, at block 610, one or more processes to instruct the crash aggregation processor 112 to update the crash characteristics in response to determining that the crash was not successfully replicated within the virtual environment 120. These updates to the crash characteristics may include narrowing the pattern to more closely replicate the identified crash event within the production environment 118 such that the crash characteristics are less broadly applicable to other crash incidents beyond the specific crash experience with the production environment 118. In one example, if the login profile cannot be used to access the virtual environment, the crash tracking engine 206 may execute one or more processes to provide access to the production environment 118 using the login profile generated by the crash tracking engine 206.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of any of FIGS. 1-4 may be implemented as standalone hardware elements embodied as application-specific integrated circuits or similar hardware elements. In another example, two or more of the elements of FIGS. 1-4 may be combined together and implemented as dedicated hardware elements. In yet another example, one or more elements of FIGS. 1-4 may be implemented as firmware and/or software modules. Further, one or more of the elements of FIGS. 1-4 may be embodied using a general-purpose or specialized computing system, such as computing system 700 from FIG. 7.

Figure 7:
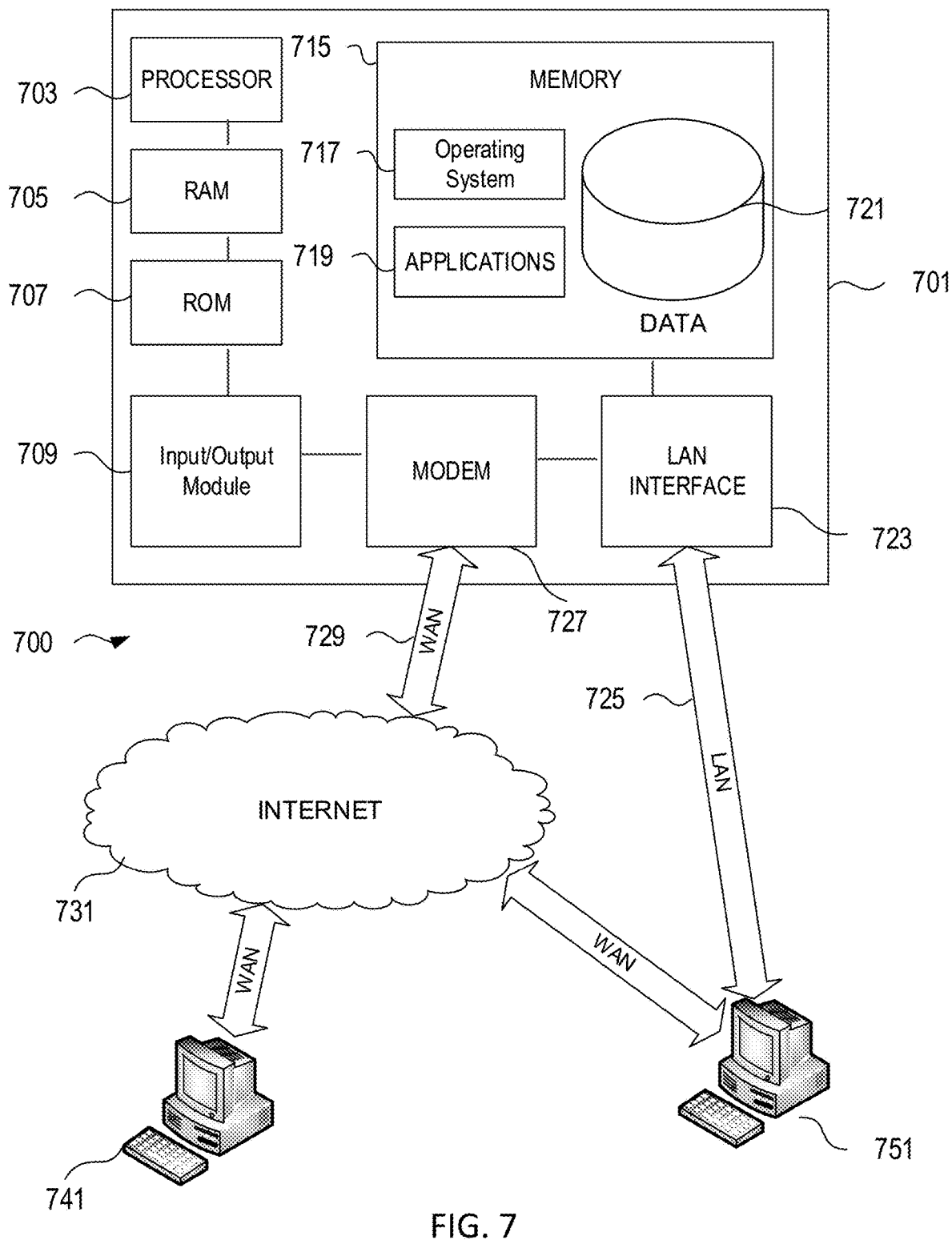
FIG. 7 shows an illustrative operating environment in which various aspects of the disclosure may be implemented, according to one or more aspects described herein.

As such, the crash simulator device 102, or one or more of the modules of the apparatus 102 may be implemented as one or more network-linked computer devices, such as device 701 from FIG. 7. Thus, the crash simulator device 102 may be implemented on consolidated computing hardware, such as computing device 701, at a single geographic location, and/or on a single integrated circuit, and the like. In another example, the crash simulator device 102 may be implemented across multiple computing devices at a common, or dispersed geographic locations. In one example, the device 701 may be in communication with devices 741 and 751 using one or more networking technologies (725, 729, and/or 731) described in further detail in the description that follows.

In one example implementation, computing device 701 may have a processor 703 for controlling overall operation of device 701 and its associated components, including RAM 705, ROM 707, an input/output (I/O) module 709, and memory 715. In one example, as will be apparent to those of ordinary skill in the art, memory 715 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 715 may comprise a non-transitory computer-readable medium that may communicate instructions to processor 703 to be executed.

I/O module 709 may include a microphone, keypad, touch screen, and/or stylus through which a user of the computing device 701 may provide input, and may also include one or more of a speaker for providing audio output and a video display device for providing textual, audiovisual and/or graphical output. Software may be stored within memory 715 and/or storage to provide instructions to the processor 703 for allowing the computing device 701 to perform various functions. For example, memory 715 may store software used by the computing device 701, such as an operating system 717, application programs 719, and an associated database 721. The processor 703 and its associated components may allow the computing device 701 to run a series of computer-readable instructions to process and format data.

The computing device 701 may operate in a networked environment supporting connections to one or more remote computers, such as computing devices 741 and 751. In one example, the computing devices 741 and 751 may be personal computers or servers that include many, or all, of the elements described above relative to the computing device 701. Specifically, the computing device 741 may represent one or more elements of the remote environment 120 and computing device 751 may represent one or more elements of the destination environment 140. Alternatively, computing device 741 and/or 751 may be a data store that is affected by the operation of the computing device 701. The network connections depicted in FIG. 7 include a local area network (LAN) 725 and a wide area network (WAN) 729, but may also include other networks. When used in a LAN networking environment, the computing device 701 is connected to the LAN 725 through a network interface or adapter 723. When used in a WAN networking environment, the computing device 701 may include a modem 727 or other means for establishing communications over the WAN 729, such as the Internet 731. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 701, 741, and/or 751 may be wired or wireless, and may utilize Wi-Fi, a cellular network, Bluetooth, infrared communication, or an Ethernet cable, among many others.

An application program 719 used by the computing device 701 according to an illustrative embodiment of the disclosure may include computer-executable instructions for invoking functionality related to a crash simulator device 102. The computing device 701 and/or the other devices 741 or 751 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, crash simulator device 102 is configured to generate a virtual environment that replicates a crash event by processing a number of variables over a timescale that was previously not achievable due to the complexity of the number of variables and permutations involved in the computations. The crash simulator device 102 achieves this reduction in time and improvement in computational complexity using artificial intelligence processes facilitated by the intelligence module 202. Accordingly, the crash simulator device 102 is configured to greatly reduce the time needed to manually assess a crash within a production environment 118, and to facilitate assessment that considers more complex sets of data variables than were previously possible. Further advantageously, the crash simulator device 102 is configured to monitor and interpret tens of thousands, hundreds of thousands, or millions of user interactions with a production environment 118. In one example, the crash simulator device 102 may execute monitoring and simulation processes in real time. This real-time processing is not otherwise possible using conventional computational systems due to the speed with which users in aggregate are interacting with production environment 118 and the complexity of monitoring flows through one or more applications implemented within the production environment. In one example, the crash simulator device 102 achieves significantly higher efficiency than conventional crash monitoring processes by using artificial intelligence to aid in defining the scope and reducing the number of elements applicable to a virtual environment simulation of a crash. The crash simulator device 102 may additionally be used to monitor multiple user's interactions with a same or different applications running within the production environment 118. In certain examples, the crash simulator device 102 may be configured to monitor thousands, tens of thousands, hundreds of thousands, or one million or more users simultaneously accessing applications within the production environment 118. Accordingly, the crash simulator device 102 facilitates identification of data flows through applications that are otherwise too numerous or complex for manual identification, even with the aid of computational processing.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a crash simulator device that has a production environment monitoring engine that is configured to monitor a user's interaction with an application running within a production environment. The production environment monitoring engine may also include a crash activity identification processor that is configured to receive data from a logging system that stores user interactions with the application. The crash activity identification processor may also be configured to filter the received data to identify a crash event and to identify dependent software classes utilized during the user's interaction with the production environment prior to the crash event. The crash activity identification processor may also store in a crash event array, information about the crash event in combination with identified dependent software classes. A crash aggregation processor of the production environment monitoring engine may be configured to receive crash event information from the crash event array, identify a pattern in crash events from the received crash event information, and output crash characteristic data associated with the identified pattern. The crash simulator device may also include a virtual environment engine that is configured to receive the crash characteristic data from the crash aggregation processor, implement a virtual environment corresponding to the crash characteristic data, and output an interface that replicates the production environment and the crash event.

The crash aggregation processor of the crash simulator device may also identify a pattern in the crash events using a machine learning process module.

In one example, the crash aggregation processor may be configured to identify, using the machine learning process module, a task that the user intends to carry out within the production environment.

The virtual environment implemented by the virtual environment engine may replicate the crash event applicable to the dependent software classes used by the user and other dependent software classes utilized by another user within the identified pattern.

The crash aggregation processor may further include a data masking module that is configured to mask the crash characteristic data prior to the crash characteristic data being outputted to the virtual environment engine.

The crash simulator device may also include a crash tracking engine that is configured to receive data from the crash aggregation processor about the crash event, generate a login profile that replicates characteristics of the user, wherein the login profile is used to access the virtual environment.

In one example, if, upon accessing the virtual environment, the crash activity identification processor detects that the crash event is not replicated, the crash activity identification processor may execute processes to send instructions to the crash aggregation processor to update the crash characteristics.

In one example, the updating of the crash characteristics may include narrowing the pattern to more closely replicate the identified crash event.

If the login profile cannot be used access the virtual environment, the crash tracking engine may provide access to the production environment using the login profile.

In another aspect, a crash simulator device may include a processor, and a non-transitory computer-readable medium comprising computer-executable instructions that, when executed by the processor, are configured to: monitor a user's interaction with an application running within a production environment, receive data from a logging system that stores user interactions with the application, filter the received data to identify a crash event, identify dependent software classes used during the user's interaction with the production environment prior to the crash event, store in a crash event array, information about the crash event in combination with identified dependent software classes, identify a pattern in crash event stored in the crash event array, generate crash characteristic data associated with the identified pattern, implement a virtual environment corresponding to the crash characteristic data, and output an interface that replicates a production environment and the crash event.

The non-transitory computer-readable medium comprising computer-executable instructions may further be configured to identify the pattern in the crash events using a machine learning process module.

The machine learning process module may be configured to identify a task that the user intends to carry out within the production environment.

The virtual environment may replicate the crash event applicable to the dependent software classes used by the user and other dependent software classes utilized by another user within the identified pattern.

The non-transitory computer-readable medium may comprise computer-executable instructions that when executed by the processor are configured to mask the crash characteristic data prior to the crash characteristic data being implemented in the virtual environment engine.

The non-transitory computer-readable medium may comprise computer-executable instructions that when executed by the processor are configured to receive data from the crash aggregation processor about the crash event, and generate a login profile that replicates characteristics of the user, wherein the login profile is used to access the virtual environment.

In another aspect, a method for crash test simulation may include: monitoring a user's interaction with an application running within a production environment, receiving data from a logging system that stores user interactions with the application, filtering the received data to identify a crash event, identifying dependent software classes utilized during the user's interaction with the production environment prior to the crash event, storing in a crash event array, information about the crash event in combination with identified dependent software classes, identifying a pattern in crash event stored in the crash event array, generating crash characteristic data associated with the identified pattern, implementing a virtual environment corresponding to the crash characteristic data, and outputting an interface that replicates a production environment and the crash event.

The method may also include identifying the pattern in the crash events using a machine learning process module.

The machine learning process module may be configured to identify a task that the user intends to carry out within the production environment.

The virtual environment may replicate the crash event applicable to the dependent software classes used by the user and other dependent software classes used by another user within the identified pattern.

The method may also include masking the crash characteristic data prior to the crash characteristic data being implemented but in the virtual environment engine.

Accordingly, it will be understood that the invention is not to be limited to the embodiments disclosed herein, but is to be understood from the following claims, which are to be interpreted as broadly as allowed under the law.

What is claimed is:

1. A crash simulator device comprising:
   a processor executing a production environment monitoring engine configured to monitor a user's interaction with an application of a production environment, the production environment monitoring engine further comprising:
   a crash activity identification processor implemented as an application-specific integrated circuit hardware element, configured to:
      receive data from a logging system that stores user interactions with the application;
      filter the received data to identify a crash event;
      identify dependent software classes utilized during the user's interaction with the production environment prior to the crash event;
      store in a crash event array, information about the crash event in combination with identified dependent software classes;
   a crash aggregation processor implemented as an application-specific integrated circuit hardware element, configured to:
   receive crash event information from the crash event array;
   identify a pattern in crash events from the received crash event information;
   output crash characteristic data associated with the identified pattern;
      a virtual environment engine, configured to:
         receive the crash characteristic data from the crash aggregation processor;
      implement a virtual environment corresponding to the crash characteristic data; and
      output an interface that replicates the production environment and the crash event.

2. The crash simulator device of claim 1, wherein the crash aggregation processor identifies the pattern in the crash events using a machine learning process module.

3. The crash simulator device of claim 2, wherein the crash aggregation processor is configured to identify, using the machine learning process module, a task that the user intends to carry out within the production environment.

4. The crash simulator device of claim 1, wherein the virtual environment implemented by the virtual environment engine replicates the crash event applicable to the dependent software classes used by the user and other dependent software classes utilized by another user within the identified pattern.

5. The crash simulator device of claim 1, wherein the crash aggregation processor further comprises a data masking module and is configured to mask the crash characteristic data prior to the crash characteristic data being outputted to the virtual environment engine.

6. The crash simulator device of claim 1, further comprising a crash tracking engine, configured to:
   receive data from the crash aggregation processor about the crash event;
   generate a login profile that replicates characteristics of the user, wherein the login profile is used to access the virtual environment.

7. The crash simulator device of claim 6, wherein if, upon accessing the virtual environment, the crash activity identification processor detects that the crash event is not replicated, the crash activity identification processor sends instructions to the crash aggregation processor to update the crash characteristics.

8. The crash simulator device of claim 7, wherein updating the crash characteristics includes narrowing the pattern to more closely replicate the identified crash event.

9. The crash simulator device of claim 6, wherein if the login profile cannot be used to access the virtual environment, the crash tracking engine provides access to the production environment using the login profile.

10. A crash simulator device comprising:
    a processor;
    a non-transitory computer-readable medium comprising computer-executable instructions that, when executed by the processor, are configured to:
    monitor a user's interaction with an application of a production environment;
    receive data from a logging system that stores user interactions with the application;
    filter the received data to identify a crash event;
    identify using a crash activity identification processor implemented as an application-specific integrated circuit hardware element, dependent software classes utilized during the user's interaction with the production environment prior to the crash event;
    store in a crash event array, information about the crash event in combination with identified dependent software classes;
    identify using a crash aggregation processor implemented as an application-specific integrated circuit hardware element a pattern in crash events stored in the crash event array;
    generate crash characteristic data associated with the identified pattern;
    implement a virtual environment corresponding to the crash characteristic data; and
    output an interface that replicates a production environment and the crash event.

11. The crash simulator device of claim 10, wherein the non-transitory computer-readable medium comprises computer-executable instructions that when executed by the processor are further configured to:
    identify the pattern in the crash events using a machine learning process module.

12. The crash simulator device of claim 11, wherein the processor executing the machine learning process module and is configured to identify a task that the user intends to carry out within the production environment.

13. The crash simulator device of claim 10, wherein the virtual environment replicates the crash event applicable to the dependent software classes used by the user and other dependent software classes utilized by another user within the identified pattern.

14. The crash simulator device of claim 10, wherein the non-transitory computer-readable medium comprises computer-executable instructions that when executed by the processor are further configured to:
    mask the crash characteristic data prior to the crash characteristic data.

15. The crash simulator device of claim 10, wherein the non-transitory computer-readable medium comprises computer-executable instructions that when executed by the processor are further configured to:
- receive data about the crash event;
- generate a login profile that replicates characteristics of the user, wherein the login profile is used to access the virtual environment.

16. A method for crash test simulation, comprising:
- monitoring a user's interaction with an application running within a production environment;
- receiving data from a logging system that stores user interactions with the application;
- filtering the received data to identify a crash event;
- identifying using a crash activity identification processor implemented as an application-specific integrated circuit hardware element, dependent software classes utilized during the user's interaction with the production environment prior to the crash event;
- storing in a crash event array, information about the crash event in combination with identified dependent software classes;
- identifying using a crash aggregation processor implemented as an application-specific integrated circuit hardware element a pattern in crash events stored in the crash event array;
- generating crash characteristic data associated with the identified pattern;
- implementing a virtual environment corresponding to the crash characteristic data; and
- outputting an interface that replicates a production environment and the crash event.

17. The method of claim 16, further comprising:
- identifying the pattern in the crash events using a machine learning process module.

18. The method of claim 17, wherein the processor executing the machine learning process module and is configured to identify a task that the user intends to carry out within the production environment.

19. The method of claim 16, wherein the virtual environment replicates the crash event applicable to the dependent software classes used by the user and other dependent software classes utilized by another user within the identified pattern.

20. The method of claim 16, further comprising:
- masking the crash characteristic data prior to the crash characteristic data being outputted.

* * * * *